United States Patent
Chen

(10) Patent No.: US 10,268,881 B2
(45) Date of Patent: Apr. 23, 2019

(54) PATTERN CLASSIFYING APPARATUS, INFORMATION PROCESSING APPARATUS, PATTERN CLASSIFYING METHOD, AND NON-TRANSITORY COMPUTER READABLE STORAGE MEDIUM

(71) Applicant: CANON KABUSHIKI KAISHA, Tokyo (JP)

(72) Inventor: Tsewei Chen, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 154 days.

(21) Appl. No.: 15/277,191

(22) Filed: Sep. 27, 2016

(65) Prior Publication Data

US 2017/0091593 A1    Mar. 30, 2017

(30) Foreign Application Priority Data

Sep. 30, 2015  (JP) .................................. 2015-194396
Jun. 17, 2016  (JP) .................................. 2016-121223

(51) Int. Cl.
*G06K 9/46*     (2006.01)
*G06K 9/66*     (2006.01)
*G06K 9/00*     (2006.01)
*G06K 9/62*     (2006.01)

(52) U.S. Cl.
CPC ..... *G06K 9/00362* (2013.01); *G06K 9/00993* (2013.01); *G06K 9/6257* (2013.01)

(58) Field of Classification Search
None
See application file for complete search history.

(56) References Cited

U.S. PATENT DOCUMENTS

2009/0304290 A1*  12/2009  Fukaya .............. G06K 9/00228
                                            382/224

OTHER PUBLICATIONS

P. Viola et al., "Rapid Object Detection using a Boosted Cascade of Simple Features", Proceedings of IEEE Conference on Computer Vision and Pattern Recognition, vol. 1, pp. 1 to 9, Dec. 2001.
Piotr Dollár, et al., "Integral Channel Features", Proceedings of British Machine Vision Conference, pp. 1 to 11, Sep. 2009.
Junguk Cho, et al., "Hardware Acceleration of Multi-View Face Detection", Proceedings of IEEE Symposium on Application Specific Processors, pp. 66 to 69, Jul. 2009.

* cited by examiner

*Primary Examiner* — Kevin Ky
(74) *Attorney, Agent, or Firm* — Carter, Deluca & Farrell LLP

(57) ABSTRACT

A pattern classifying apparatus according to the present invention accesses at least two of a plurality of memories holding data to be used in pattern classification in parallel so as to read a plurality of data pieces and performs pattern classification with weak classifiers by using the plurality of read data pieces.

12 Claims, 11 Drawing Sheets

PATTERN CLASSIFYING APPARATUS, INFORMATION PROCESSING APPARATUS, PATTERN CLASSIFYING METHOD, AND NON-TRANSITORY COMPUTER READABLE STORAGE MEDIUM

BACKGROUND OF THE INVENTION

Field of the Invention

The present invention relates to a pattern classifying technique.

Description of the Related Art

Techniques for classifying a specific pattern such as the human body or face in an image have been proposed. In particular, attention has recently been given to high-speed and low-cost pattern classification techniques for use in an integrated system such as a mobile terminal or an on-board device.

An algorithm for speeding up pattern detection has been proposed by P. Viola, M. Jones in Rapid Object Detection using a Boosted Cascade of Simple Features, Proceedings of IEEE Conference on Computer Vision and Pattern Recognition, Vol. 1, pp. 511 to 518, December 2001 (hereinafter referred to as Non-Patent Document 1). In this algorithm, parameters are generated by boosting learning, and weak classifiers are sequentially processed by using feature images. Then, it is determined, based on the result of classification performed by a weak classifier, whether to process the next weak classifier. If it is determined that the next weak classifier is not to be processed, the processing of the remaining weak classifiers is omitted.

According to Integral Channel Features, by Piotr Dollár, et al., Proceedings of British Machine Vision Conference, pp. 91.1 to 91.11, September 2009, the accuracy of pattern detection is improved by extending the technique of Non-Patent Document 1 and increasing the number of types of feature images.

A hardware implementation method for speeding up face detection has been proposed by Junguk Cho, et al. in Hardware Acceleration of Multi-View Face Detection, Proceedings of IEEE Symposium on Application Specific Processors, pp. 66 to 69, July 2009. The technique disclosed in Hardware Acceleration of Multi-View Face Detection, by Junguk Cho, et al., Proceedings of IEEE Symposium on Application Specific Processors, pp. 66 to 69, July 2009 reduces the processing time by processing weak classifiers for classifying the faces in a plurality of categories (postures and the like) in a spatially parallel manner and reading feature images from image window buffers.

The classification processing techniques that use a plurality of cascaded weak classifiers in order to implement highly accurate pattern classification, as disclosed in: Rapid Object Detection using a Boosted Cascade of Simple Features, by P. Viola, M. Jones, Proceedings of IEEE Conference on Computer Vision and Pattern Recognition, Vol. 1, pp. 511 to 518, December 2001; Integral Channel Features, by Piotr Dollar, et al., Proceedings of British Machine Vision Conference, pp. 91.1 to 91.11, September 2009; and Hardware Acceleration of Multi-View Face Detection, by Junguk Cho, et al., Proceedings of IEEE Symposium on Application Specific Processors, pp. 66 to 69, July 2009, are techniques commonly used as high-speed and low-cost techniques. Also, the type of feature image is a factor that affects the processing speed and accuracy of classification processing. The performance of classification processing can be improved by increasing the number of types of feature images, but the number of memories for holding feature images also increases.

Also, in order to reduce the reference time for referencing feature images and speed up weak classifier processing, in the technique disclosed in Hardware Acceleration of Multi-View Face Detection, by Junguk Cho, et al., Proceedings of IEEE Symposium on Application Specific Processors, pp. 66 to 69, July 2009, registers for holding feature images are provided. Feature images are referenced in parallel from the registers, and at the same time, a plurality of weak classifiers are processed. However, the use of registers as data holding devices is problematic in that the circuit scale is large. This problem becomes more prominent when the number of feature images is increased for the purpose of improving performance (Integral Channel Features, by Piotr Dollár, et al., Proceedings of British Machine Vision Conference, pp. 91.1 to 91.11, September 2009).

SUMMARY OF THE INVENTION

The present invention has been made in view of the problems described above, and the present invention provides a technique for performing pattern classification at a higher speed while suppressing an increase in the number of memories.

According to the first aspect of the present invention, there is provided a pattern classifying apparatus including a plurality of logically cascaded weak classifiers, the apparatus comprising: a holding unit including a plurality of memories holding data to be used in pattern classification; and a processing unit configured to access at least two of the plurality of memories in parallel so as to read a plurality of data pieces, and perform pattern classification with the weak classifiers by using the plurality of read data pieces.

According to the second aspect of the present invention, there is provided an information processing apparatus comprising: a pattern classifying apparatus including a plurality of logically cascaded weak classifiers, the pattern classifying apparatus comprising: a holding unit including a plurality of memories holding data to be used in pattern classification; and a processing unit configured to access at least two of the plurality of memories in parallel so as to read a plurality of data pieces, and perform pattern classification with the weak classifiers by using the plurality of read data pieces, and an executing unit configured to execute processing by using a result of the pattern classification performed by the pattern classifying apparatus.

According to the third aspect of the present invention, there is provided a pattern classifying method performed by a pattern classifying apparatus including a plurality of logically cascaded weak classifiers, the method comprising: accessing at least two of a plurality of memories in parallel so as to read a plurality of data pieces, the plurality of memories holding data to be used in pattern classification; and performing pattern classification with the weak classifiers by using the plurality of read data pieces.

According to the fourth aspect of the present invention, there is provided a non-transitory computer readable storage medium storing a computer program for causing a computer including a plurality of logically cascaded weak classifiers to execute the following: accessing at least two of a plurality of memories in parallel so as to read a plurality of data pieces, the plurality of memories holding data to be used in pattern classification; and performing pattern classification with the weak classifiers by using the plurality of read data pieces.

Further features of the present invention will become apparent from the following description of exemplary embodiments (with reference to the attached drawings).

DESCRIPTION OF THE EMBODIMENTS

Figure 1:
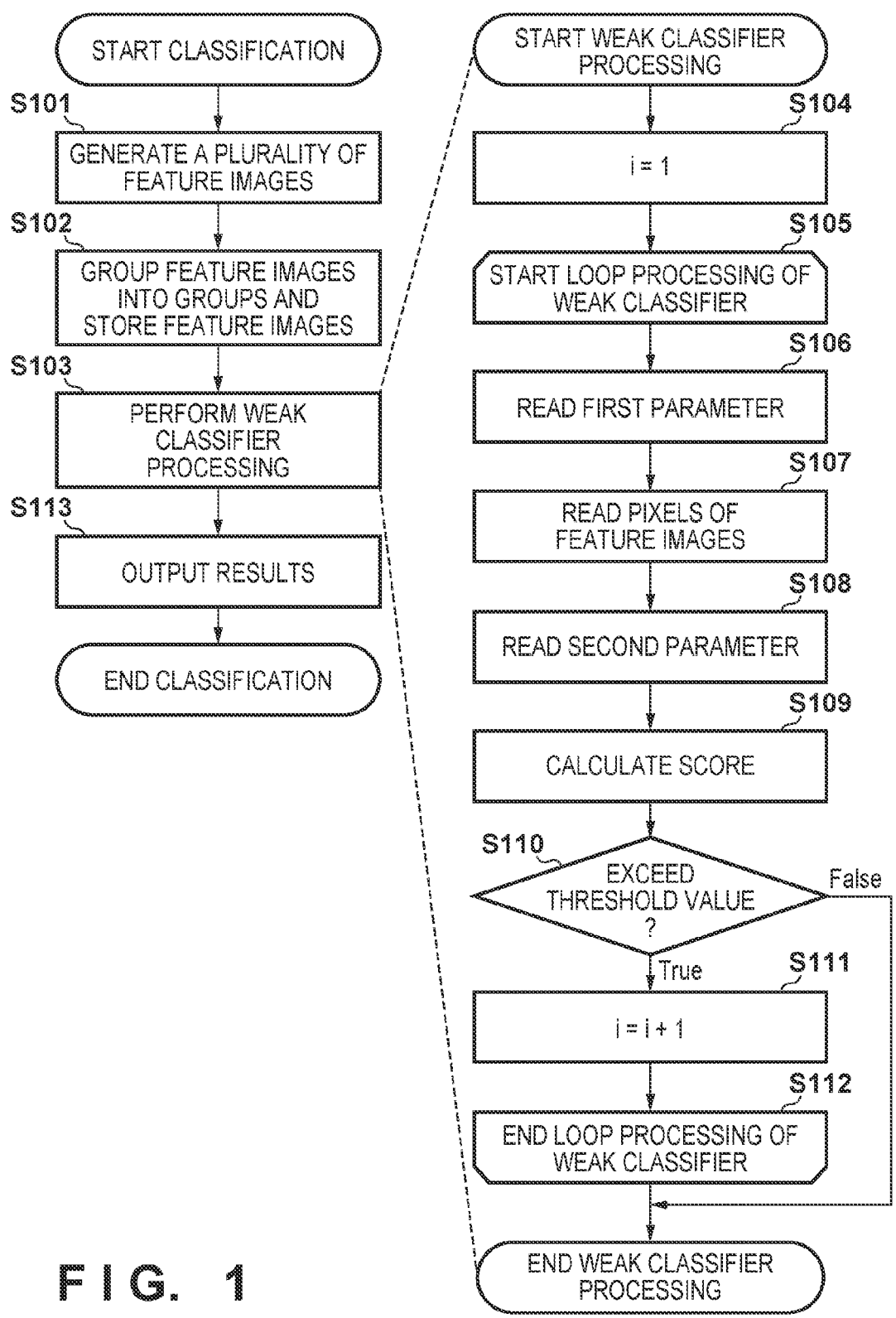
FIG. 1 is a flowchart of pattern classification processing performed by a pattern classifying apparatus.

Hereinafter, embodiments of the present invention will be described with reference to the accompanying drawings. The embodiments described below are provided to show examples in which the present invention is specifically carried out, and are therefore merely specific examples of the configurations recited in the appended claims.

First Embodiment

Hereinafter, a description will be given of an example of a pattern classifying apparatus including a plurality of logically cascaded weak classifiers, the pattern classifying apparatus having a configuration as described below. To be specific, the pattern classifying apparatus includes a plurality of memories holding data to be used in pattern classification, and is configured to access at least two of the plurality of memories in parallel so as to read data therefrom and perform pattern classification that uses weak classifiers by using the read data. Accordingly, the present invention is not limited to the configurations described in the embodiments given below as long as it is possible to obtain the above-described configuration, and it is possible to make modifications and changes as appropriate.

First, an example of a functional configuration of a pattern classifying apparatus according to the present embodiment will be described with reference to the block diagram shown in FIG. 8.

A feature image generation unit 801 receives an input of an image (for example, an RGB image) including a pattern classification target such as a person, as an input image. The input source for inputting the input image is not limited to a specific input source. The input image may be read from a storage device such as a hard disk drive device or may be supplied from an image capturing apparatus such as a digital camera.

Then, the feature image generation unit 801 generates a plurality of feature images from the input image. The method for generating feature images is not limited to a specific generation method, and any generation method can be used as long as it is possible to generate feature images suitable for use in pattern classification. For example, a method can be used in which filters are applied to an input image so as to generate, as feature images, an image having each pixel value representing Y component (luminance value) of the input image, an image having each pixel value representing Cb component (color difference) of the input image, and an image having each pixel value representing Cr component (color difference) of the input image.

Then, the feature image generation unit 801 divides the plurality of generated feature images into a plurality of groups. Then, the feature image generation unit 801 stores the feature images in a group holding unit 802 such that the feature images belonging to the same group are stored in the same memory and the feature images belonging to a different group are stored in a different memory.

The group holding unit 802 includes a plurality of memories, and the feature images belonging to the same group are stored in each memory. Also, the group holding unit 802 is configured to be capable of referencing (accessing) data stored in the plurality of different memories in parallel.

A weak classifier processing unit 804 includes a plurality of logically cascaded weak classifiers, and is configured to operate the weak classifiers in a time-division manner by using first parameters and second parameters held in a parameter holding unit 805 so as to perform pattern classification on the feature images. Hereinafter, the expression "to execute a weak classifier" and similar expressions may be used to indicate that a weak classifier is operated.

The parameter holding unit 805 holds the above-described first parameters and second parameters. As used herein, "first parameter" refers to information that is provided for each weak classifier and defines a pattern classification target by the weak classifier. Likewise, "second parameter" refers to information that is provided for each weak classifier and is used to determine whether or not the result of pattern classification performed by the weak classifier is successful.

The results of pattern classification performed by the individual weak classifiers included in the weak classifier processing unit 804 are stored in a classification result holding unit 806. At the time when the results of pattern classification performed by all of the weak classifiers are stored in the classification result holding unit 806, the classification result holding unit 806 obtains a final pattern classification result. Accordingly, when pattern classification has been performed by all of the weak classifiers, the weak classifier processing unit 804 reads the final pattern classification result from the classification result holding unit 806 and outputs the final pattern classification result.

A control unit 803 performs overall control on the operations of the pattern classifying apparatus as well as performing control on the operations of the feature image generation unit 801 and the weak classifier processing unit 804.

Pattern classification processing performed by the pattern classifying apparatus according to the present embodiment will be described next with reference to the flowchart shown in FIG. 1.

Step S101

When the feature image generation unit 801 receives an input image, the feature image generation unit 801 generates a plurality of feature images from the input image.

Step S102

The feature image generation unit 801 divides the plurality of feature images generated in step S101 into a plurality of groups based on defined criteria. Then, the feature image generation unit 801 stores the feature images into the group holding unit 802 such that the feature images belonging to group 1 are stored in memory 1, the feature images belonging to group 2 are stored in memory 2, and so on. That is, the feature images are stored such that the feature images belonging to the same group are stored in the same memory, and the feature images belonging to a different group are stored in a different memory.

Figure 4:
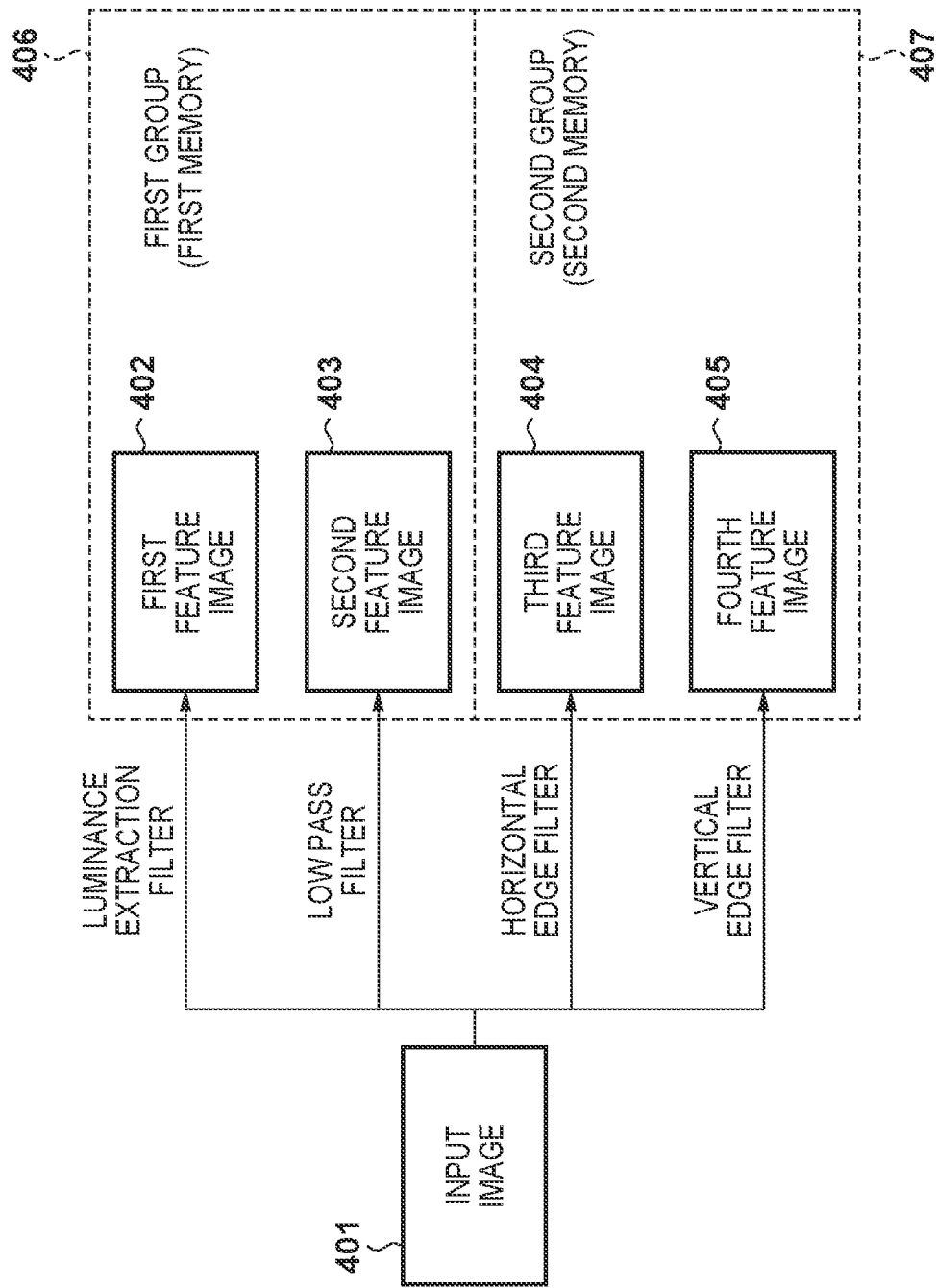
FIG. 4 is a diagram showing an example of how feature images are divided into groups.

For example, as shown in FIG. 4, the feature image generation unit 801 applies four different types of filters to an input image 401 so as to generate four feature images (a first feature image 402, a second feature image 403, a third feature image 404 and a fourth feature image 405). To be specific, first, a luminance extraction filter is used to extract luminance information from the input image 401 so as to generate a first feature image 402. Next, a low pass filter is used to extract a low frequency component from the input image 401 so as to generate a second feature image 403. Then, a horizontal edge filter is used to extract horizontal edge information from the input image 401 so as to generate a third feature image 404. Finally, a vertical edge filter is used to extract vertical edge information from the input image 401 so as to generate a fourth feature image 405. It is also possible to simultaneously generate these four feature images. It is assumed here that the four feature images are divided into two groups based on defined criteria. In FIG. 4, the first feature image 402 and the second feature image 403 are classified as a first group 406, and the third feature image 404 and the fourth feature image 405 are classified as a second group 407. In this case, the first feature image 402 and the second feature image 403 belonging to the first group 406 are stored in a first memory, which is one of the plurality of memories included in the group holding unit 802 and is a memory provided for the first group. Likewise, the third feature image 404 and the fourth feature image 405 belonging to the second group 407 are stored in a second memory, which is one of the plurality of memories included in the group holding unit 802 and is a memory provided for the second group. The first memory and the second memory are separate memories. With the use of separate memories in this way, the weak classifier processing unit 804 can access these memories in parallel.

The number of groups into which feature images are divided is not limited to a specific value, and can be determined based on, for example, the processing capability and band of the pattern classifying apparatus, and the like. Also, the method for dividing feature images into groups is not limited to a specific method. It is possible to use a method in which, for example, first parameters determined by a learning algorithm are analyzed (feature image access pattern analysis) and for each weak classifier, a group is set such that the probability of reference to the pixels of the feature image from a different group increases. The feature image access pattern varies depending on the pattern classification target, and thus the feature image reference frequency is not uniform. In the case of, for example, the pattern classification target is a bright object having a large number of horizontal edges, the frequency of reference to the pixels of the first feature image 402 (luminance information) and the third feature image 404 (horizontal edge information) is high, and the frequency of reference to the pixels of the other feature images is low. In order to increase the probability that the pixels of feature images are referenced in parallel from a different memory, the first feature image 402 and the third feature image 404 are grouped as belonging to different groups, and thus are not stored in the same memory. In the case of the pattern classification target is a dark object having a large number of vertical edges, the frequency of reference to the pixels of the first feature image 402 (luminance information) and the fourth feature image 405 (vertical edge information) is high, and the frequency of reference to the pixels of the other feature images is low. In order to increase the probability that the pixels of feature images are referenced in parallel from a different memory, the first feature image 402 and the fourth feature image 405 are grouped as belonging to different groups, and thus are not stored in the same memory. The first parameters and the second parameters are determined in advance by a learning algorithm (boosting learning or the like).

Step S103

The weak classifier processing unit 804 causes each of the cascaded weak classifiers in a time-division manner to perform operation, and performs pattern classification by using the feature images stored in the group holding unit 802 and the first and second parameters stored in the parameter holding unit 805. In step S103, processing from step S104 to step S112 is performed. The following description will be given based on the assumption that the weak classifier processing unit 804 includes M cascaded weak classifiers, where M is a natural number of 2 or more.

Step S104

The control unit 803 initializes the value of a variable i used in the following processing to 1. Hereinafter, the loop processing from step S105 to S112 is performed i times, where i represents 1 to M (unless false is determined in step S110).

Step S106

The weak classifier processing unit 804 reads, from the parameter holding unit 805, a first parameter for the i-th weak classifier (the weak classifier that first performs operation is referred to as the first weak classifier). As used herein, "the first parameter for the i-th weak classifier" refers to set-data indicating a pixel position in a feature image referenced by the i-th weak classifier for pattern classification and identification information (for example, a number unique to an image) unique to the feature image. For example, in the case where the i-th weak classifier references a pixel position PA of a feature image A and a pixel position PB of a feature image B in order to perform pattern classification, "the first parameter for the i-th weak classifier" contains the following two sets of data:

a set of data including the identification information and the pixel position PA of the feature image A; and a set of data including the identification information and the pixel position PB of the feature image B.

Such a first parameter is provided for each weak classifier. To be more specific, in "the first parameter for the i-th weak classifier", the j-th set of data $D_{i,j}$ is a set of data as shown below, where $1 \leq j \leq K$, and K represents the number of sets of data included in "the first parameter for the i-th weak classifier".

[Math. 1]

$$D_{i,j} = (N_{i,j}, Y_{i,j}, X_{i,j}) \qquad \text{Equation 1}$$

In Equation 1, $N_{i,j}$ represents identification information of a feature image, and is for example, a number unique to the feature image. Likewise, $Y_{i,j}$ represents a y coordinate value of a pixel position referenced for pattern classification in the feature image specified by the identification information $N_{i,j}$.

Likewise, $X_{i,j}$ represents an x coordinate value of the pixel position referenced for pattern classification in the feature image specified by the identification information $N_{i,j}$. Note that where i is a fixed value, $N_{i,j}$ represents identification information of a different feature image corresponding to j.

Step S107

The weak classifier processing unit 804 reads a pixel value at a pixel position $(X_{i,1}, Y_{i,1})$ in a feature image specified by the identification information $N_{i,1}, \ldots,$ and a pixel value at a pixel position $(X_{i,K}, Y_{i,K})$ in a feature image specified by the identification information $N_{i,K}$ in parallel from the group holding unit 802, and supplies the read pixel values to the i-th weak classifier.

K feature images such as "the feature image specified by the identification information $N_{i,1}$", . . . , and "the feature image specified by the identification information $N_{i,K}$" are feature images that belong to mutually different groups, and thus they are registered in different memories. Accordingly, in this step, the weak classifier processing unit 804 can access the memories storing "the feature image specified by the identification information $N_{i,1}$", . . . , and "the feature image specified by the identification information $N_{i,K}$" in parallel. With this configuration, the pixel value at the pixel position $(X_{i,1}, Y_{i,1})$ in the feature image specified by the identification information $N_{i,1}, \ldots,$ and the pixel value at the pixel position $(X_{i,K}, Y_{i,K})$ in the feature image specified by the identification information $N_{i,K}$ can be read in parallel.

Then, the i-th weak classifier performs pattern classification by using the pixel values read in parallel from the group holding unit 802 in this step. The pattern classification that uses pixel values read from feature images is a known technique, and thus a description thereof is omitted here.

Each data set included in the first parameter does not necessarily indicate one pixel position, and may indicate a pixel region composed of a plurality of pixels. A configuration is also possible in which each data set included in the first parameter indicates one pixel position and the pixel values within a neighborhood pixel region of the pixel position are read at the time of reading pixel values. Also, the first parameter may indicate pixel positions in a plurality of images or a plurality of pairs of pixel positions in a time-series space used to process a movie.

Step S108

The weak classifier processing unit 804 reads, from the parameter holding unit 805, a second parameter for the i-th weak classifier. As used herein, "the second parameter for the i-th weak classifier" refers to set-data indicating a threshold value and a feature amount transformation function that is a function for calculating a score corresponding to a target pattern probability based on the pixel values read for the i-th weak classifier in step S107.

Step S109

The i-th weak classifier calculates a score by using the pixel values read in step S107 and the feature amount transformation function included in the second parameter for the i-th weak classifier read in step S108. It is assumed here that "the pixel value at a pixel position $(X_{i,j}, Y_{i,j})$ in the feature image specified by the identification information $N_{i,j}$" is represented by $f(N_{i,j}, X_{i,j}, Y_{i,j})$. Also, it is assumed that the feature amount transformation function for the i-th weak classifier is represented by $L_i(\ )$. If K is 2, a score $S_i$ for the i-th weak classifier is calculated by the following equation.

$$S_i = L_i(f(N_{i,1}, X_{i,1}, Y_{i,1}), f(N_{i,2}, X_{i,2}, Y_{i,2}))  \quad \text{[Math. 2]}$$

If K is a natural number of 3 or more, each pixel value may be transformed to a score in the same manner by using the feature amount transformation function.

Step S110

The i-th weak classifier determines whether or not the score $S_i$ obtained in step S109 exceeds a threshold value $T_i$ included in the second parameter for the i-th weak classifier read in step S108. If it is determined as a result the determination that $S_i$ is greater than $T_i$ ($S_i > T_i$), it is determined that the pattern classification has been successfully performed (a predetermined pattern has been detected=true), and the processing advances to step S111. If, on the other hand, it is determined that $S_i$ is less than or equal to $T_i$ ($S_i \leq T_i$), it is determined that the pattern classification was not successfully performed (a predetermined pattern was not detected=false), and the processing advances to step S113.

That is, in the case of $S_i \leq T_i$, the pattern classification ends at the i-th weak classifier without performing pattern classification with the (i+1)th weak classifier and the subsequent weak classifiers. If it is determined that the pattern classification has been successfully performed, the i-th weak classifier stores the result of the pattern classification in the classification result holding unit 806.

Step S111

The control unit 803 increments the value of the variable i by one. Then, the processing returns to step S106, and the subsequent processing is performed by using the variable i that has been incremented.

Step S113

When the processing of steps S105 to S112 is performed with respect to i=1 to M, or in other words, when all of the scores calculated for the first to M-th weak classifiers exceed a threshold value, the weak classifier processing unit 804 determines that the input image includes a predetermined pattern. Accordingly, in this case, the weak classifier processing unit 804 outputs, to an appropriate output destination, the result of pattern classification held by the classification result holding unit 806 through the above-described processing. The result of pattern classification may be output directly without being processed, but it is also possible to output other information based on the result of pattern classification such as, for example, transforming to a corresponding object ID before outputting the result of pattern classification.

If, on the other hand, it is determined that the score calculated for any one of the first to M-th weak classifiers does not exceed the threshold value, the weak classifier processing unit 804 determines that the input image does not include a predetermined pattern. Accordingly, in this case, the weak classifier processing unit 804 outputs, to an appropriate output destination, information indicating that the input image does not include a predetermined pattern. As "the information indicating that the input image does not include a predetermined pattern", any type of information can be used. For example, a message indicating that the input image does not include a predetermined pattern may be output to a display apparatus or an external device.

Figure 2:
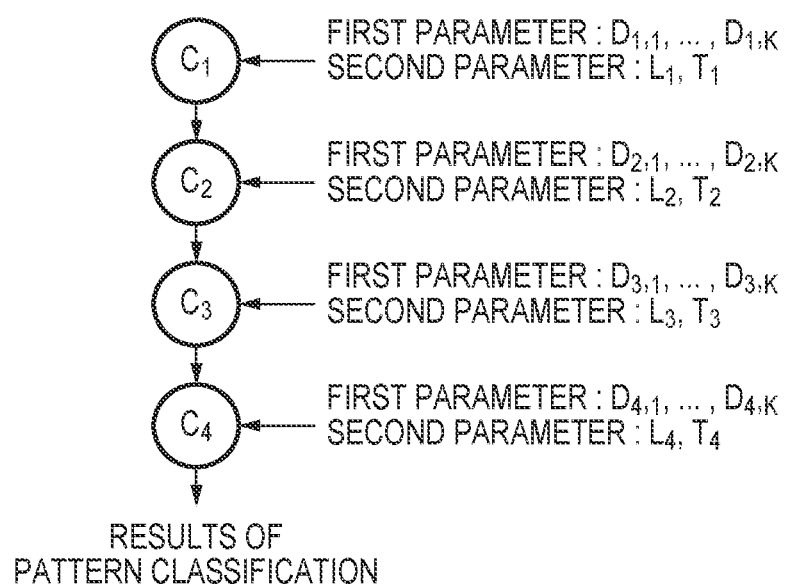
FIG. 2 is a diagram illustrating pattern classification using M cascaded weak classifiers.

The above pattern classification using M cascaded weak classifiers will be described in further detail with reference to FIG. 2. In FIG. 2, M is set to 4.

First, a weak classifier C1, which is the first weak classifier, performs operation. The weak classifier C1 receives an input of $D_{1,1}, \ldots$ and $D_{1,K}$ as a first parameter for the weak classifier C1, a feature amount transformation function $L_1$ as a second parameter for the weak classifier C1, and a threshold value $T_1$. Accordingly, the weak classifier C1 reads the pixel value at the pixel position in the feature image specified by $D_{1,1}, \ldots$, and the pixel value at the pixel position in the feature image specified by $D_{1,K}$ in parallel from the group holding unit 802. Then, the weak classifier C1 performs pattern classification by using the read pixel values. Furthermore, the weak classifier C1 transforms the pixel value at the pixel position in the feature image specified by $D_{1,1}, \ldots$, and the pixel value at the pixel position in the feature image specified by $D_{1,K}$ to a score $S_1$ by using the feature amount transformation function $L_1$. Then, the weak classifier C1 determines whether or not $S_1 > T_1$ (classification has been successfully performed). If it is determined that $S_1 > T_1$, the weak classifier processing unit 804 causes a weak classifier C2, which is the second weak classifier (that is subsequent to the weak classifier C1), to perform operation. If, on the other hand, it is determined that $S_1 \leq T_1$ (classification was not successfully performed), the weak classifier processing unit 804 does not cause the weak classifiers that are subsequent to the weak classifier C2 to perform operation, and the weak classifier processing unit 804 outputs a result indicating that the input image does not have a predetermined pattern.

Next, in the case where the weak classifier C2 performs operation, the weak classifier C2 receives an input of $D_{2,1}, \ldots$, and $D_{2,K}$ as a first parameter for the weak classifier C2, a feature amount transformation function $L_2$ as a second parameter for the weak classifier C2, and a threshold value $T_2$. Accordingly, the weak classifier C2 reads the pixel value at the pixel position in the feature image specified by $D_{2,1}, \ldots$, and the pixel value at the pixel position in the feature image specified by $D_{2,K}$ in parallel from the group holding unit 802. Then, the weak classifier C2 performs pattern classification by using the read pixel values. Furthermore, the weak classifier C2 transforms the pixel value at the pixel position in the feature image specified by $D_{2,1}, \ldots$, and the pixel value at the pixel position in the feature image specified by $D_{2,K}$ to a score $S_2$ by using the feature amount transformation function $L_2$. Then, the weak classifier C2 determines whether or not $S_2 > T_2$. If it is determined that $S_2 > T_2$, the weak classifier processing unit 804 causes a weak classifier C3, which is the third weak classifier, to perform operation. If, on the other hand, it is determined that $S_2 \leq T_2$, the weak classifier processing unit 804 does not cause the weak classifiers that are subsequent to the weak classifier C3 to perform operation, and the weak classifier processing unit 804 outputs a result indicating that the input image does not have a predetermined pattern.

Next, in the case where the weak classifier C3 performs operation, the weak classifier C3 receives an input of $D_{3,1}, \ldots$, and $D_{3,K}$ as a first parameter for the weak classifier C3, a feature amount transformation function $L_3$ as a second parameter for the weak classifier C3, and a threshold value $T_3$. Accordingly, the weak classifier C3 reads the pixel value at the pixel position in the feature image specified by $D_{3,1}, \ldots$, and the pixel value at the pixel position in the feature image specified by $D_{3,K}$ in parallel from the group holding unit 802. Then, the weak classifier C3 performs pattern classification by using the read pixel values. Furthermore, the weak classifier C3 transforms the pixel value at the pixel position in the feature image specified by $D_{3,1}, \ldots$, and the pixel value at the pixel position in the feature image specified by $D_{3,K}$ to a score $S_3$ by using the feature amount transformation function $L_3$. Then, the weak classifier C3 determines whether or not $S_3 > T_3$. If it is determined that $S_3 > T_3$, the weak classifier processing unit 804 causes a weak classifier C4, which is the fourth weak classifier, to perform operation. If, on the other hand, it is determined that $S_3 \leq T_3$, the weak classifier processing unit 804 does not cause the weak classifier C4 to perform operation, and the weak classifier processing unit 804 outputs a result indicating that the input image does not have a predetermined pattern.

Next, in the case where the weak classifier C4 performs operation, the weak classifier C4 receives an input of $D_{4,1}, \ldots$, and $D_{4,K}$ as a first parameter for the weak classifier C4, a feature amount transformation function $L_4$ as a second parameter for the weak classifier C4, and a threshold value $T_4$. Accordingly, the weak classifier C4 reads the pixel value at the pixel position in the feature image specified by $D_{4,1}, \ldots$, and the pixel value at the pixel position in the feature image specified by $D_{4,K}$ in parallel from the group holding unit 802. Then, the weak classifier C4 performs pattern classification by using the read pixel values. Furthermore, the weak classifier C4 transforms the pixel value at the pixel position in the feature image specified by $D_{4,1}, \ldots$, and the pixel value at the pixel position in the feature image specified by $D_{4,K}$ to a score $S_4$ by using the feature amount transformation function $L_4$. Then, the weak classifier C4 determines whether or not $S_4 > T_4$. If it is determined that $S_4 > T_4$, the weak classifier processing unit 804 outputs the final pattern classification result held by the classification result holding unit 806. If, on the other hand, it is determined that $S_4 \leq T_4$, the weak classifier processing unit 804 outputs a result indicating that the input image does not have a predetermined pattern.

Figure 10:
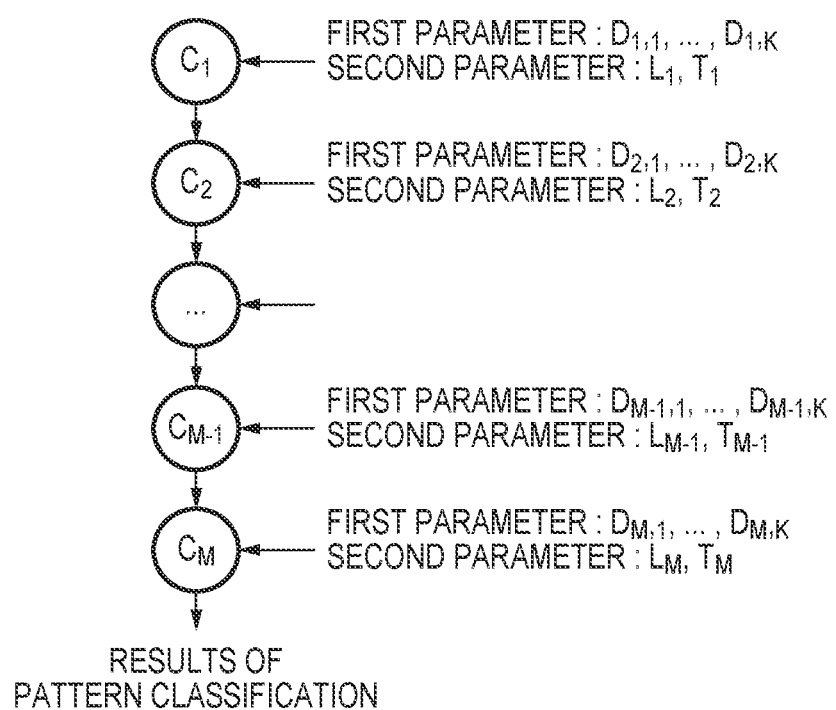
FIG. 10 is a diagram showing M cascaded weak classifiers.

M cascaded weak classifiers are configured as shown in FIG. 10. In this case as well, pattern classification is performed sequentially from the weak classifier C1. If pattern classification is successfully performed, pattern classification is performed by the next weak classifier.

Figure 3:
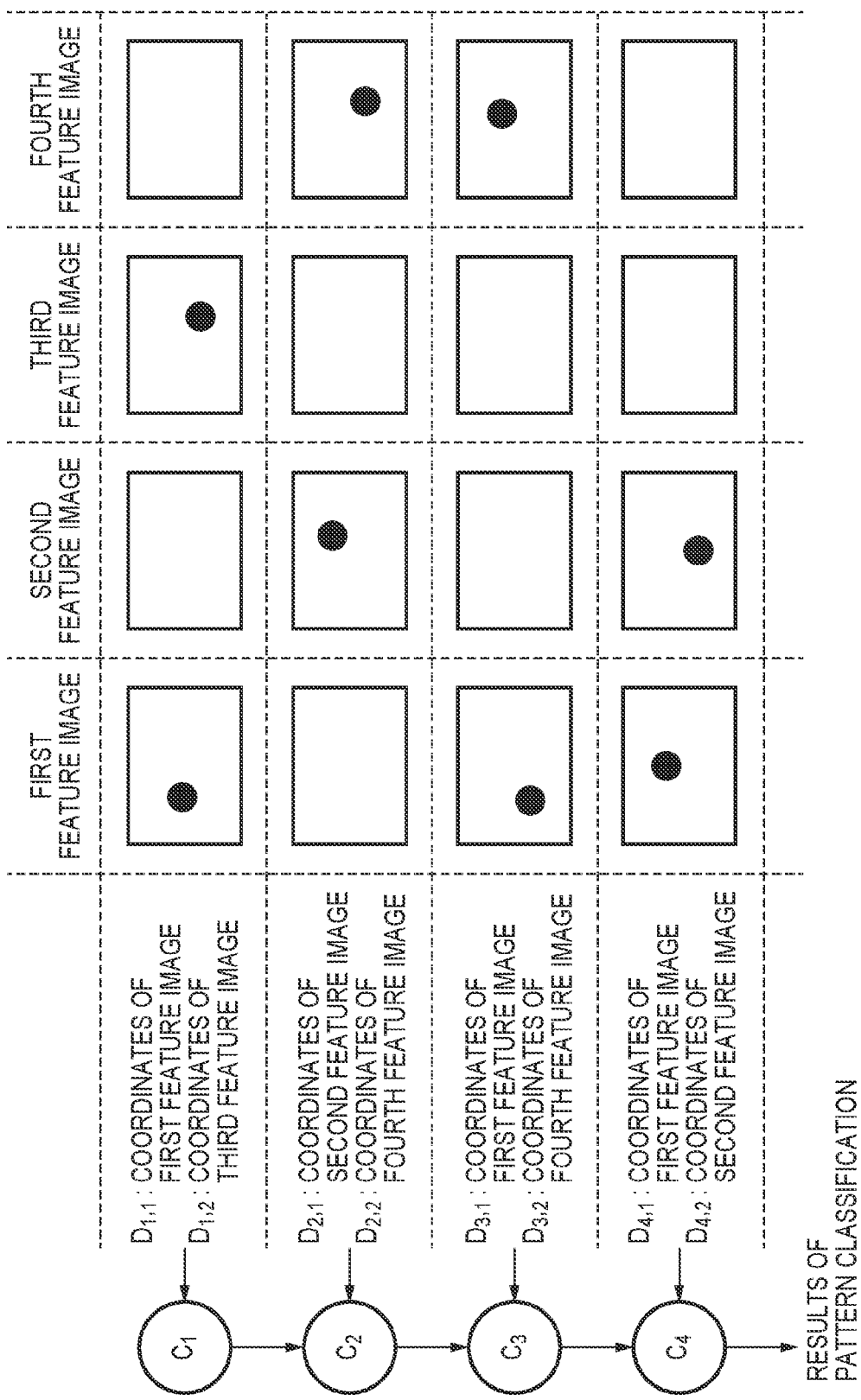
FIG. 3 is a diagram showing an example of first parameters respectively input to weak classifiers.

Next, a description will be given of an example of first parameters respectively input to weak classifiers in a configuration as shown in FIG. 2 in which pattern classification is performed by four cascaded weak classifiers, with reference to FIG. 3. In FIG. 3, four feature images, namely, a first feature image, a second feature image, a third feature image and a fourth feature image, have been generated from an input image.

In FIG. 3, a first parameter for the weak classifier C1 includes two sets of data, namely, $D_{1,1}$ and $D_{1,2}$. $D_{1,1}$ is a set of data including identification information of the first feature image and a pixel position indicated by a black dot in the first feature image. $D_{1,2}$ is a set of data including identification information of the third feature image and a pixel position indicated by a black dot in the third feature image.

A first parameter for the weak classifier C2 includes two sets of data, namely, $D_{2,1}$ and $D_{2,2}$. $D_{2,1}$ is a set of data including identification information of the second feature image and a pixel position indicated by a black dot in the second feature image. $D_{2,2}$ is a set of data including identification information of the fourth feature image and a pixel position indicated by a black dot in the fourth feature image.

A first parameter for the weak classifier C3 includes two sets of data, namely, $D_{3,1}$ and $D_{3,2}$. $D_{3,1}$ is a set of data including identification information of the first feature image and a pixel position indicated by a black dot in the first feature image. $D_{3,2}$ is a set of data including identification information of the fourth feature image and a pixel position indicated by a black dot in the fourth feature image.

A first parameter for the weak classifier C4 includes two sets of data, namely, $D_{4,1}$ and $D_{4,2}$. $D_{4,1}$ is a set of data including identification information of the first feature image and a pixel position indicated by a black dot in the first feature image. $D_{4,2}$ is a set of data including identification information of the second feature image and a pixel position indicated by a black dot in the second feature image.

In this case, in order to cause the weak classifier Ci (i=1, 2, 3 or 4) to read the pixel value corresponding to $D_{i,1}$ and the pixel value corresponding to $D_{i,2}$ in parallel, it is necessary to store the feature image corresponding to $D_{i,1}$ and the feature image corresponding to $D_{i,2}$ respectively in separate memories. Accordingly, in this case, as shown in FIG. 4, the first feature image 402 and the second feature image 403 are stored in a first memory, and the third feature image 404 and the fourth feature image 405 are stored in a second memory that is different from the first memory. By doing so, the weak classifier C1 can read the pixel value corresponding to $D_{1,1}$ from the first memory and the pixel value corresponding to $D_{1,2}$ from the second memory in parallel. Also, the weak classifier C2 can read the pixel value corresponding to $D_{2,1}$ from the first memory and the pixel value corresponding to $D_{2,2}$ from the second memory in parallel. Also, the weak classifier C3 can read the pixel value corresponding to $D_{3,1}$ from the first memory and the pixel value corresponding to $D_{3,2}$ from the second memory in parallel.

Since the pixels of up to one feature image can be read from one memory per unit time (one cycle), as a result of the pixels that need to be read being stored in different memories, the pixels can be read from the memories in one cycle.

Next is a description of the time required for the operations of the weak classifiers C1 to C4 shown in FIG. 3 in a configuration as shown in FIG. 4 in which the first to fourth feature images are grouped and held in the first memory and the second memory.

The weak classifier C1 reads the pixel value at the pixel position in the feature image corresponding to $D_{1,1}$ (the first feature image 402) from the first memory and the pixel value at the pixel position in the feature image corresponding to $D_{1,2}$ (the third feature image 404) from the second memory in parallel. As described above, access to the first memory and access to the second memory can be implemented in one cycle. Also, if it is assumed that one weak classifier requires one cycle at a minimum to perform processing other than the processing of reading the first parameter, the weak classifier C1 can perform processing in two cycles at a minimum.

The weak classifier C2 reads the pixel value at the pixel position in the feature image corresponding to $D_{2,1}$ (the second feature image 403) from the first memory and the pixel value at the pixel position in the feature image corresponding to $D_{2,2}$ (the fourth feature image 405) from the second memory in parallel. From the foregoing description, it can be understood that the weak classifier C2 can also perform processing in two cycles at a minimum.

The weak classifier C3 reads the pixel value at the pixel position in the feature image corresponding to $D_{3,1}$ (the first feature image 402) from the first memory and the pixel value at the pixel position in the feature image corresponding to $D_{3,2}$ (the fourth feature image 405) from the second memory in parallel. From the foregoing description, it can be understood that the weak classifier C3 can also perform processing in two cycles at a minimum.

The weak classifier C4 reads the pixel value at the pixel position in the feature image corresponding to $D_{4,1}$ (the first feature image 402) from the first memory and the pixel value at the pixel position in the feature image corresponding to $D_{4,2}$ (the second feature image 403) from the first memory in parallel. In this case, two pixel values are read from the first memory, which requires a time period corresponding to two cycles. As a result, it can be understood that the weak classifier C4 can perform processing in three cycles at a minimum.

Accordingly, it can be understood that, in this case, a time period corresponding to a total of 9 cycles is required to process all of the weak classifiers C1 to C4.

Figure 5:
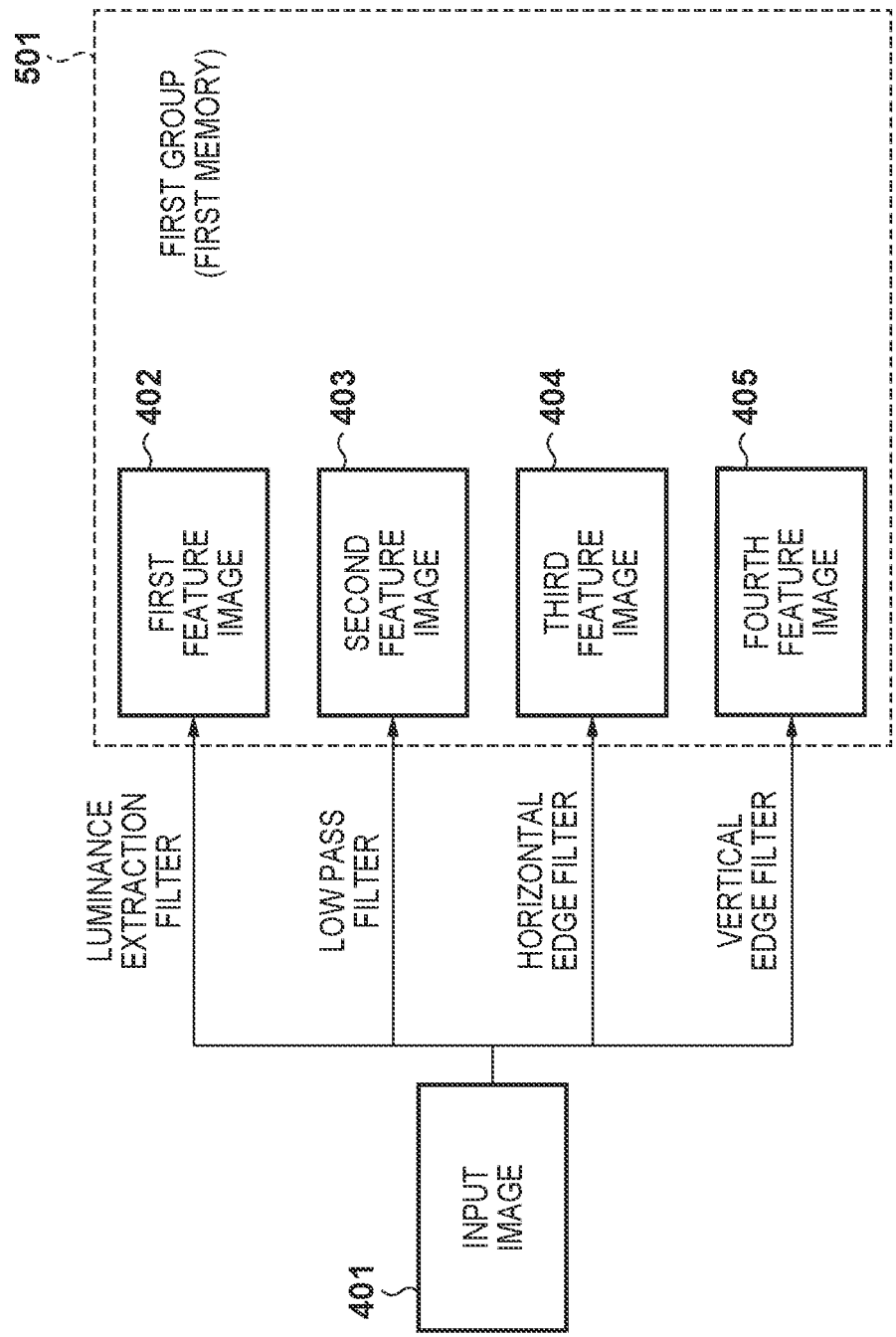
FIG. 5 is a diagram illustrating an example in which first to fourth feature images are not stored in a separate memory for each group.

Next is a description of the time required for the operations of the weak classifiers C1 to C4 shown in FIG. 3 in a configuration as shown in FIG. 5 in which the first feature image 402, the second feature image 403, the third feature image 404 and the fourth feature image 405 are not stored in a separate memory for each group. In FIG. 5, the first feature image 402, the second feature image 403, the third feature image 404 and the fourth feature image 405 have been stored in one memory (first memory) as a group 501 (group 1) without grouping the feature images.

The weak classifier C1 reads the pixel value at the pixel position in the feature image corresponding to $D_{1,1}$ (the first feature image 402) and the pixel value at the pixel position in the feature image corresponding to $D_{1,2}$ (the third feature image 404) from the first memory. In this case, two pixel values are read from the first memory, which requires a time period corresponding to two cycles. As a result, it can be understood that the weak classifier C1 requires a time period corresponding to three cycles at a minimum.

The weak classifier C2 reads the pixel value at the pixel position in the feature image corresponding to $D_{2,1}$ (the second feature image 403) and the pixel value at the pixel position in the feature image corresponding to $D_{2,2}$ (the fourth feature image 405) from the first memory. From the foregoing description, it can be understood that the weak classifier C2 also requires a time period corresponding to three cycles at a minimum.

The weak classifier C3 reads the pixel value at the pixel position in the feature image corresponding to $D_{3,1}$ (the first feature image 402) and the pixel value at the pixel position in the feature image corresponding to $D_{3,2}$ (the fourth feature image 405) from the first memory. From the foregoing description, it can be understood that the weak classifier C3 also requires a time period corresponding to three cycles at a minimum.

The weak classifier C4 reads the pixel value at the pixel position in the feature image corresponding to $D_{4,1}$ (the first feature image 402) and the pixel value at the pixel position in the feature image corresponding to $D_{4,2}$ (the second feature image 403) from the first memory. From the foregoing description, it can be understood that the weak classifier C4 also requires a time period corresponding to three cycles at a minimum.

Accordingly, it can be understood that, in this case, a time period corresponding to a total of 12 cycles is required to process all of the weak classifiers C1 to C4.

As described above, by grouping and storing the feature images generated from an input image in different memories, it is possible to reduce the time required for pattern classification by a plurality of cascaded weak classifiers as compared to the configuration in which the feature images are stored in one memory without grouping the feature images.

Second Embodiment

In the first embodiment, multiple accesses to one memory are allowed when pixel values are read for one weak classifier, such as the first parameter input to the weak classifier C4 shown in FIG. 3. In the present embodiment, parameters corresponding to respective weak classifiers are learnt by applying a constraint to the parameters. To be specific, at the time of feature selection by boosting learning, a combination of feature images corresponding to the sets of data included in the first parameter that are grouped in the same group is not selected. By doing so, when pixel values are read for one weak classifier, only one access is allowed to one memory without allowing multiple accesses to one memory. The following description will be given focusing on a difference from the first embodiment. Accordingly, unless otherwise stated, the configuration is the same as that of the first embodiment.

Figure 9:
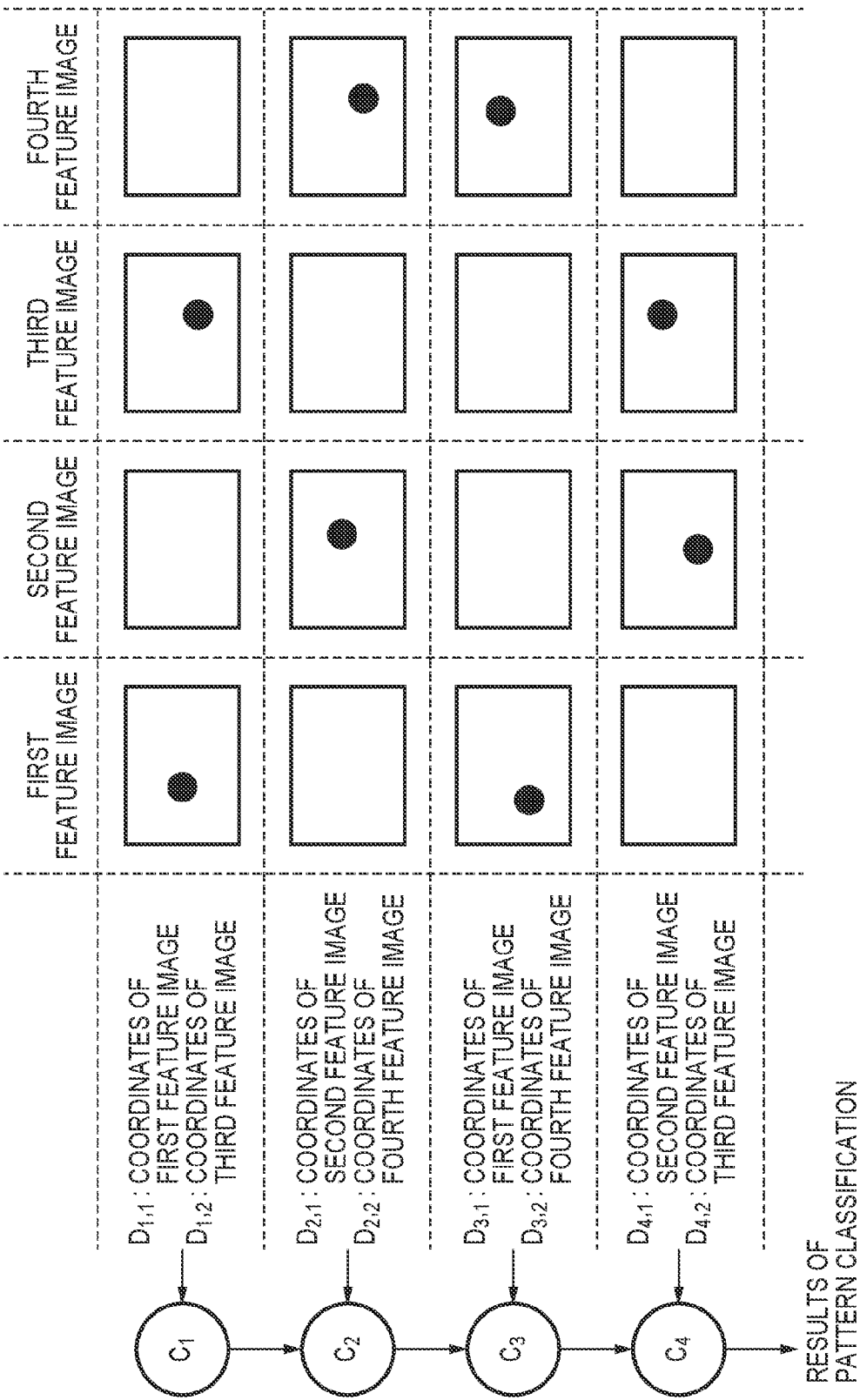
FIG. 9 is a diagram showing an example of first parameters respectively input to weak classifiers.

A description will be given of an example of first parameters respectively input to weak classifiers in a configuration as shown in FIG. 9 in which pattern classification is performed by four cascaded weak classifiers, with reference to FIG. 9. In FIG. 9, four feature images, namely a first feature image, a second feature image, a third feature image and a fourth feature image, have been generated from an input image. The first parameters input to the weak classifiers C1 to C3 are the same as those of FIG. 3, but the first parameter input to the weak classifier C4 is different from that of FIG. 3. To be specific, $D_{4,1}$ is a set of data including identification information of the second feature image and a pixel position indicated by a black dot in the second feature image. $D_{4,2}$ is a set of data including identification information of the third feature image and a pixel position indicated by a black dot in the third feature image.

Unlike the configuration shown in FIG. 3, the feature image corresponding to $D_{4,1}$ (second feature image) and the feature image corresponding to $D_{4,2}$ (third feature image) are stored in mutually different memories, with the former being stored in a first memory and the latter being stored in a second memory. Accordingly, in this case, the weak classifier C4 can also read the pixel value corresponding to $D_{4,1}$ from the first memory and the pixel value corresponding to $D_{4,2}$ from the second memory in parallel.

Next is a description of the time required for the operations of the weak classifiers C1 to C4 shown in FIG. 9 in a configuration as shown in FIG. 4 in which the first to fourth feature images are grouped and held in the first memory and the second memory. Since the weak classifiers C1 to C3 are the same as those shown in FIG. 3, the weak classifiers C1 to C3 can perform processing in two cycles at a minimum.

The weak classifier C4 reads the pixel value at the pixel position in the feature image corresponding to $D_{4,1}$ (second feature image) from the first memory and the pixel value at the pixel position in the feature image corresponding to $D_{4,2}$ (third feature image) from the second memory. As described above, access to the first memory and access to the second memory can be implemented in one cycle, and thus if it is assumed that one weak classifier requires one cycle at a minimum to perform processing other than the processing of reading the first parameter, the weak classifier C4 can also perform processing in two cycles at a minimum.

Accordingly, it can be understood that, in this case, a time period corresponding to a total of 8 cycles is required to process all of the weak classifiers C1 to C4.

Figure 6:
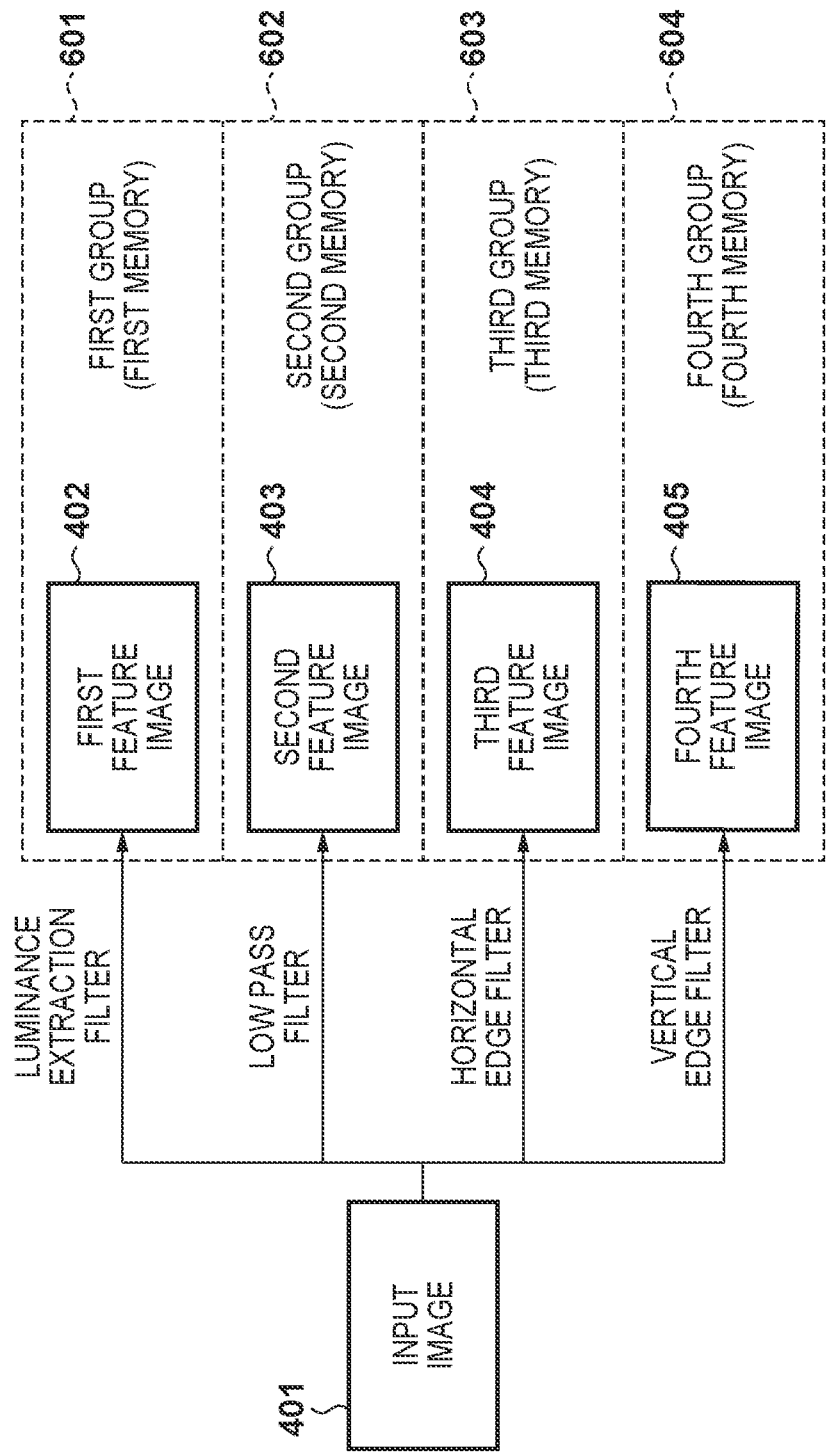
FIG. 6 is a diagram showing an example in which feature images are respectively stored in separate memories.

Here, as shown in FIG. 6, in the case where the feature images are respectively stored in separate memories, because four feature images (a first feature image 402, a second feature image 403, a third feature image 404 and a fourth feature image 405) have been generated in FIG. 6, and thus the number of memories is 4 (a first memory 601, a second memory 602, a third memory 603 and a fourth memory 604). If it is assumed here that accesses to the first to fourth memories are performed in one cycle, and that one weak classifier requires one cycle at a minimum to perform processing other than the processing of reading the first parameter, from the foregoing description, the weak classifiers C1 to C4 can each perform processing in two cycles at a minimum. Accordingly, in this case, a time period corresponding to a total of 8 cycles is required to process all of the weak classifiers C1 to C4. As described above, the number of cycles required to process all of the weak classifiers C1 to C4 is the same as that of the present embodiment. However, the number of memories used is 4 (first to fourth memories), which is greater than the number of memories required in the present embodiment (=2, i.e., a first memory and a second memory). This increases the cost at the time of implementation.

As described above, by holding the feature images in predetermined groups and applying a constraint to the learning algorithm, it is possible to consistently reference feature images of different groups from the memories included in the group holding unit in parallel, and thus high-speed processing can be achieved while suppressing an increase in the memory cost.

Variations

Figure 11:
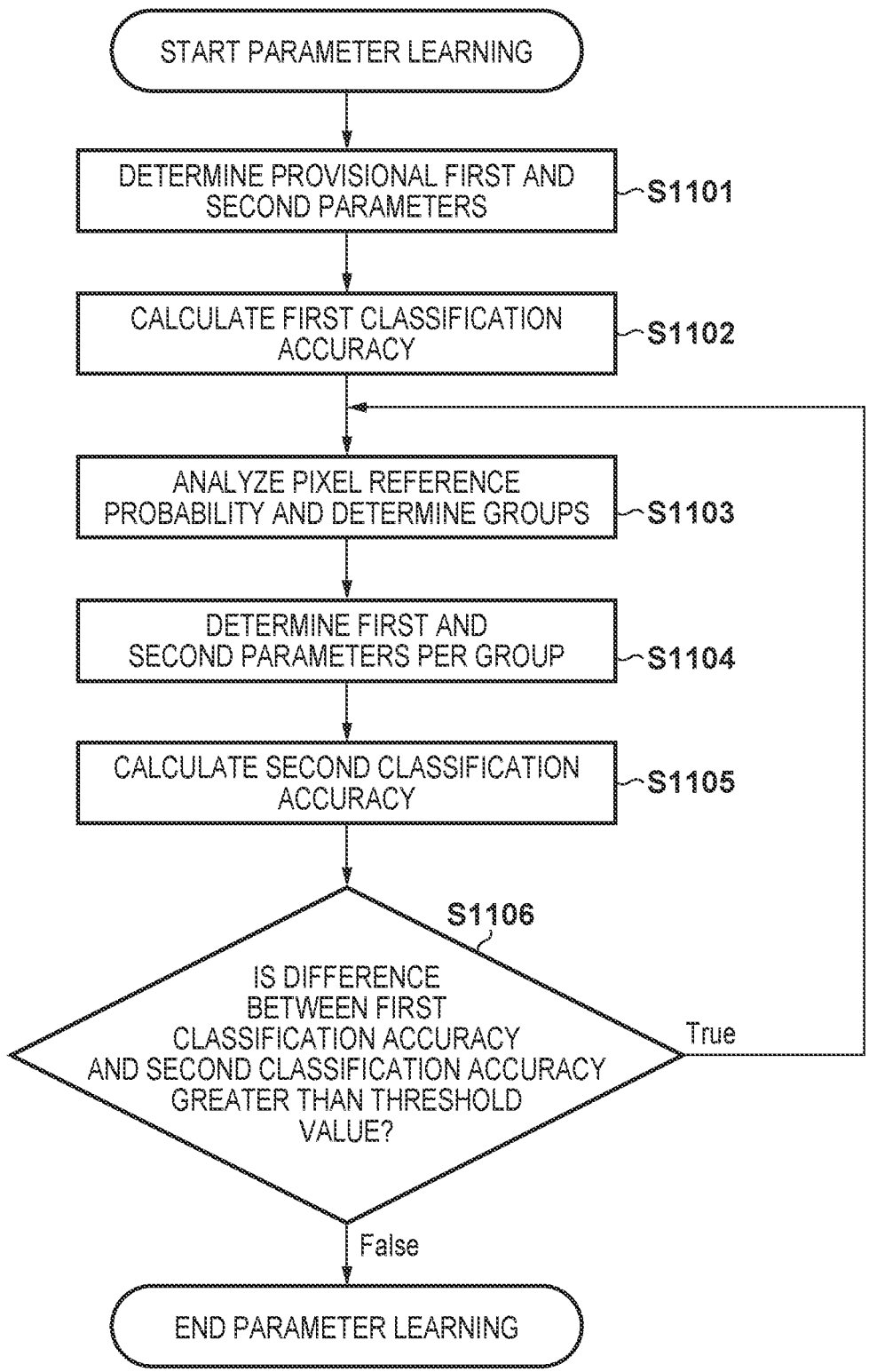
FIG. 11 is a flowchart of parameter learning according to a second embodiment.

The first and second parameters corresponding to each weak classifier may be determined in a plurality of stages. An example of parameter learning is shown in FIG. 11. In step S1101, a provisional first parameter and a provisional second parameter are determined by a learning algorithm. In step S1102, a first classification accuracy is calculated by using a test image and the provisional first and second parameters, and then stored. As used herein, "classification accuracy" means the degree of accuracy of pattern classification on the test image. In step S1103, the probability of reference to the pixels of each feature image is analyzed, and for each weak classifier, a group is set such that the probability of reference to the pixels of the feature image from a different group increases. In step S1104, for each of the groups set in step S1103, first parameters and second parameters are determined based on the constraint that the feature images can be referenced in parallel from different memories. In step S1105, a second classification accuracy is calculated by using the test image and the first and second parameters, and then stored. In step S1106, it is determined whether the difference between the first classification accuracy and the second classification accuracy is greater than a predetermined threshold value. If it is determined that the difference between the first classification accuracy and the second classification accuracy is greater than the threshold value, the processing returns to step S1103, and groups are again set. Otherwise, the parameter learning ends.

In the example described above, in order to determine groups, it is determined whether the difference between the first classification accuracy and the second classification accuracy is greater than a threshold value, but it is also possible to make the determination based on the difference in the number of weak classifiers, instead of based on the difference in the classification accuracy.

Also, in the first and second embodiments, an example was described in which pattern classification is performed on the feature images (two-dimensional data/two-dimensional array). However, the first and second embodiments can also be applied to the case where pattern classification is performed on feature data columns of any dimension generated from input data columns of any dimension.

Also, in the first and second embodiments, an example was described in which a plurality of feature images are generated from one input image, and pattern classification is performed by using the plurality of generated feature images. However, with either of the following configuration in which a plurality of feature images are generated respectively from a plurality of still images or in which a plurality of feature images are generated from each frame image constituting a movie, the substantial processing is the same as in the first and second embodiments except that the number of images that are to be grouped increases.

Also, in the first and second embodiments, an example was described in which four feature images are divided into two groups. However, the number of groups is not limited to two, and there may be any number of groups. That is, one feature image may be divided into three or more groups. Also, the feature images of one group may contain a partial feature image.

Also, feature images may be generated by subjecting an input image to arbitrary linear transformation (geometric transformation or the like) or non-linear transformation (morphological filtering or the like). Also, in the case where the input image is a color image, plain colors or the results of color conversion of the plain colors may be used as the feature images. Furthermore, the feature images may be, for example, integral images.

Also, in the first and second embodiments, an example was described in which the feature images are grouped into predetermined groups and held in different memories based on the characteristics of the parameters corresponding to the weak classifiers, but the groups may be determined according to the characteristics of the feature images.

Also, in the first and second embodiments, an example was described in which the feature images are grouped into predetermined groups and held in different memories based on the characteristics of the parameters corresponding to the weak classifiers, but the groups may be determined according to the pattern to be classified. The groups may be determined according to, for example, the object to be classified such as the human body or a vehicle.

Third Embodiment

Figure 8:
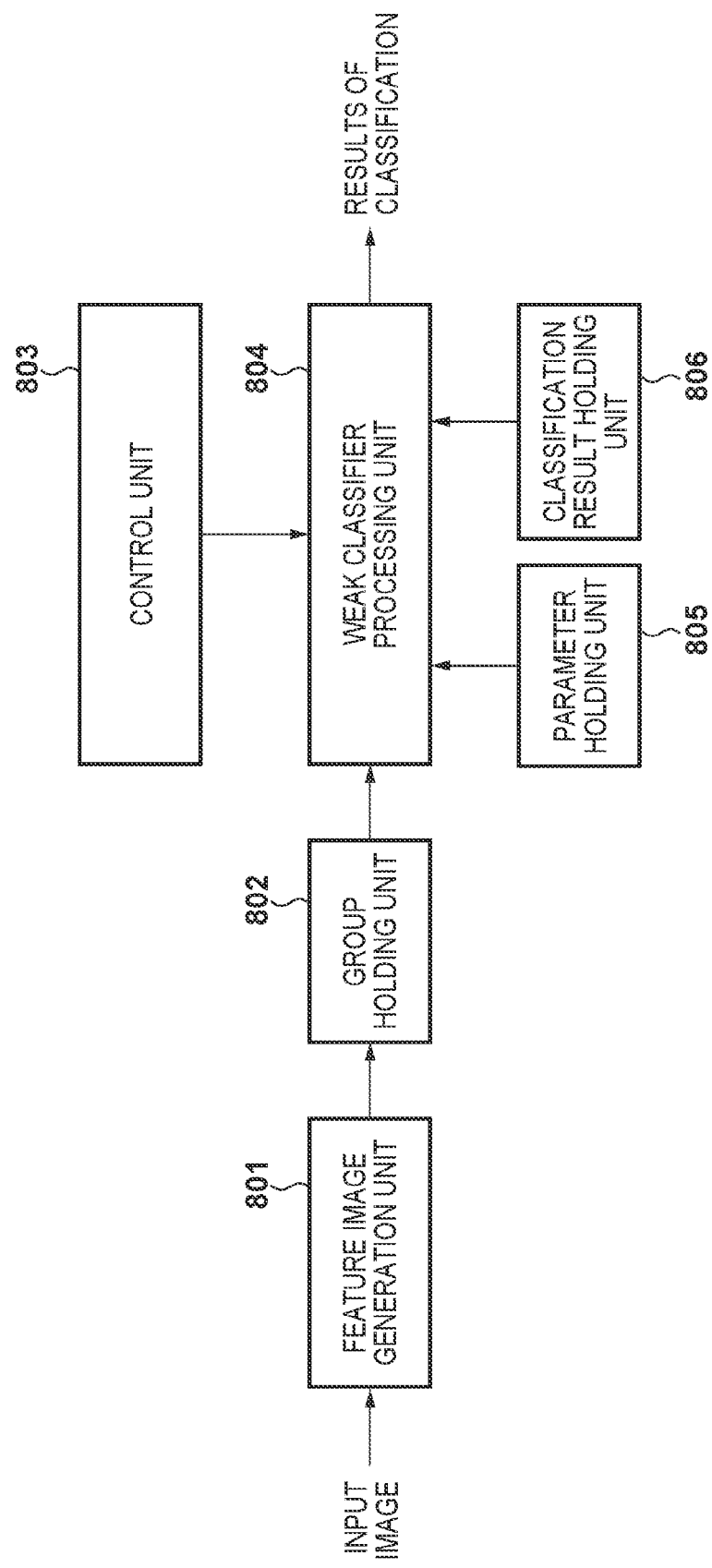
FIG. 8 is a block diagram showing an example of a functional configuration of a pattern classifying apparatus.

The functional units shown in FIG. 8 may be configured by hardware. However, it is also possible to configure the group holding unit 802, the parameter holding unit 805 and the classification result holding unit 806 by using a memory, configure the control unit 803 by using a processor such as a CPU, and configure the feature image generation unit 801 and the weak classifier processing unit 804 by using a computer program.

It is also possible to constitute a computer apparatus (information processing apparatus) equipped with a pattern classifying apparatus having the configuration shown in FIG. 8. In this case, the computer apparatus has various functions including the functions of the pattern classifying apparatuses described in the first and second embodiments. Examples of the computer apparatus include a commonly used personal computer (PC), a digital camera, a mobile phone and a tablet terminal apparatus. An example of a hardware configuration of the computer apparatus will be described with reference to the block diagram shown in FIG. 7.

The input unit 701 is configured by user interfaces such as a keyboard and a mouse, and is capable of inputting various types of instructions into a CPU 705 through operations performed by the user.

A data storage unit 702 is a large-capacity information storage device as typified by a hard disk drive device. In the data storage unit 702, an operating system (OS) and computer programs and data used to cause the CPU 705 to execute or control the processing operations that need to be performed by the computer apparatus are stored. The computer programs and data stored in the data storage unit 702 are loaded to a RAM 707 under control of the CPU 705, and processed by the CPU 705. The computer programs and data may include computer programs and data used by a classification processing unit 708.

As the data storage unit 702, other storage devices may be used. For example, a flexible disk, a CD-ROM, a CD-R, a DVD, a memory card, a CF card, a smart medium, a SD card, a memory stick, an xD picture card, a USB memory and the like can be used as the data storage unit 702. The data storage unit 702 is not necessarily provided in the computer apparatus. The data storage unit 702 may be provided as an external device, and reading and writing of data may be performed by accessing the data storage unit 702 provided as an external device via a communication unit 703.

The communication unit 703 is a unit configured to perform data communication with an external device, and performs operations such as transmitting the results of processing performed in the computer apparatus to an external device and receiving necessary information from the external device.

A display unit 704 is configured by a CRT, a liquid crystal screen, a projector or the like, and is capable of displaying/projecting the results of processing performed by the CPU 705 in the form of images, characters and the like. The input unit 701 and the display unit 704 may be made unitary to constitute a touch panel screen. In this case, the touch panel screen may be configured to receive an input of various operations from the user and display the results of processing performed by the CPU 705 in the form of images, characters and the like. Also, the display unit 704 is not necessarily provided in the computer apparatus and may be provided as an external device.

The CPU 705 performs overall control on the operations of the computer apparatus by executing computer programs and data stored in the ROM 706 and the RAM 707.

In the ROM 706, setting data, a boot program and the like of the computer apparatus are stored.

The RAM 707 includes an area for storing the computer programs and data loaded from the data storage unit 702 and the computer programs and data received by the communication unit 703 from an external device. Furthermore, the RAM 707 also includes a work area used by the CPU 705 and the classification processing unit 708 to execute various types of processing operations. As described above, the RAM 707 can provide various types of areas as appropriate. Also, the function of either one of the data storage unit 702 and the RAM 707 may be performed by the other.

The classification processing unit 708 is a pattern classifying apparatus according to the first or second embodiment, and has a configuration as shown in FIG. 8. For example, the classification processing unit 708 performs pattern classification by using first and second parameters and feature images acquired from an external device via the communication unit 703 or acquired by the RAM 707 from the data storage unit 702. The results of processing performed by the classification processing unit 708 may be stored in the RAM 707 or the data storage unit 702, or may be transmitted to an external device via the communication unit 703.

A configuration is also possible in which the CPU 705 performs image processing and image recognition by using the results of pattern classification performed by the classification processing unit 708. In this case, the CPU 705 may store the results of image processing and image recognition in the data storage unit 702, or may transmit the results to an external device via the communication unit 703.

The input unit 701, the data storage unit 702, the communication unit 703, the display unit 704, the CPU 705, the ROM 706, the RAM 707 and the classification processing unit 708 are each connected to a bus 709.

Figure 7:
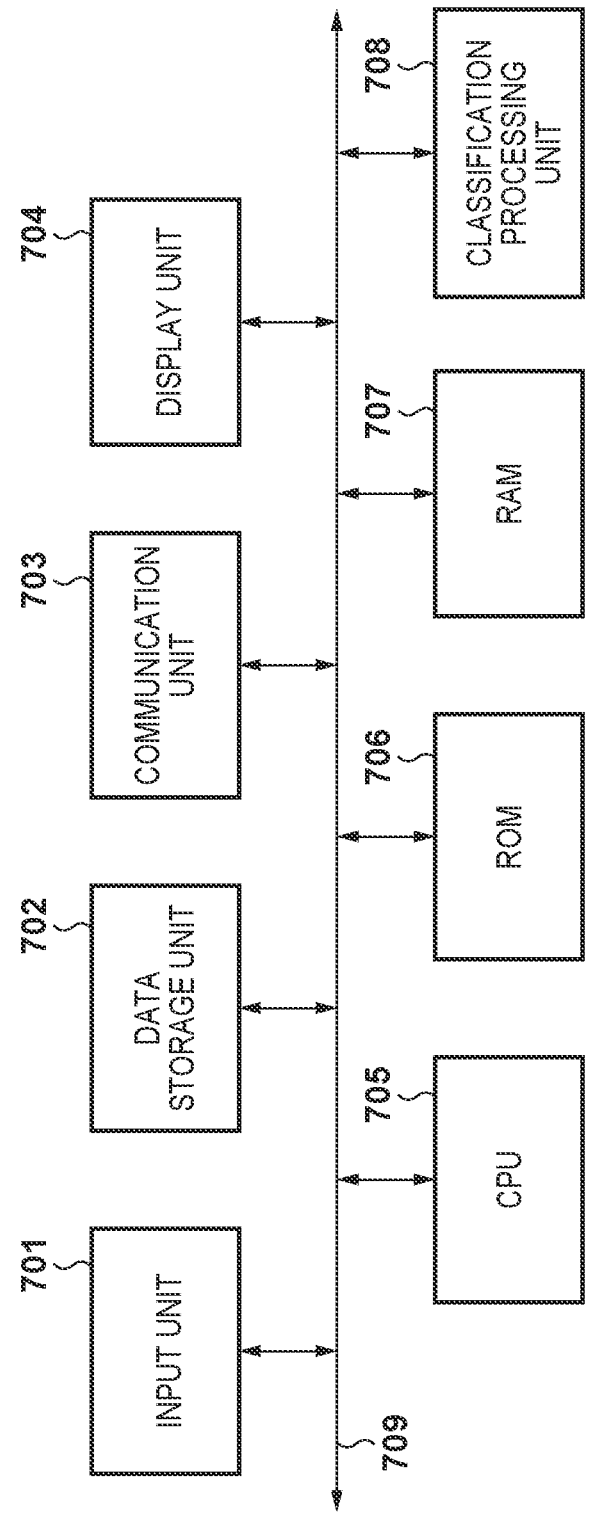
FIG. 7 is a block diagram showing an example of a hardware configuration of a computer apparatus.

Note that the configuration shown in FIG. 7 is merely an example. It is possible to, for example, provide a plurality of CPUs 705, and implement the same configuration as that of FIG. 7 by using a plurality of computer apparatuses. Also, a part or all of the embodiments and variations described above may be combined as appropriate, or may be used selectively.

Other Embodiments

Embodiment(s) of the present invention can also be realized by a computer of a system or apparatus that reads and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2015-194396, filed Sep. 30, 2015, and 2016-121223, filed Jun. 17, 2016, which are hereby incorporated by reference herein in their entirety.

What is claimed is:

1. A pattern classifying apparatus including a plurality of logically cascaded weak classifiers, the apparatus comprising:
one or more processors; and
a plurality of memories coupled to the one or more processors, the memories holding data to be used in pattern classification and having stored thereon instructions which, when executed by the one or more processors, cause the pattern classifying apparatus to:
generate a plurality of feature images from an input image and divide the plurality of feature images into a plurality of groups;
store each group of feature images into respective one of the plurality of memories;
access in parallel at least two of the plurality of memories holding data required to perform pattern classification by a first weak classifier among the plurality of logically cascaded weak classifiers so as to read out at least two feature images in parallel; and
perform the pattern classification with the first weak classifier by using the at least two read feature images; and
if the pattern classification with the first weak classifier is successfully performed, access in parallel the at least two memories holding data required to perform pattern classification by a second weak classifier that is subsequent to the first weak classifier so as to read out at least two feature images and perform the pattern classification with the second weak classifier by using the at least two read feature images.

2. The pattern classifying apparatus according to claim 1, wherein in dividing the plurality of feature images, the instructions, when executed by the one or more processors, cause the pattern classifying apparatus to divide the plurality of feature images into the plurality of groups such that the feature images referenced by respective weak classifiers for pattern classification belong to different groups.

3. The pattern classifying apparatus according to claim 1, wherein in dividing the plurality of feature images, the instructions, when executed by the one or more processors, cause the pattern classifying apparatus to divide the plurality of feature images into the plurality of groups according to a probability that the weak classifiers reference the feature images.

4. The pattern classifying apparatus according to claim 1, further comprising a parameter holding memory configured to hold parameters referenced by the weak classifiers for pattern classification.

5. The pattern classifying apparatus according to claim 4, wherein the parameter holding memory is configured to hold parameters for each of the weak classifiers.

6. The pattern classifying apparatus according to claim 5, wherein the parameter holding memory is configured to hold, for each of the weak classifiers, a first parameter that defines a pattern classification target of pattern classification performed by the weak classifier.

7. The pattern classifying apparatus according to claim 6, wherein the first parameter includes identification information of a feature image referenced for pattern classification and a pixel position in the feature image.

8. The pattern classifying apparatus according to claim 5, wherein the parameter holding memory is configured to hold, for each of the weak classifiers, a second parameter for determining whether or not a result of pattern classification with the weak classifier is successful.

9. The pattern classifying apparatus according to claim 8, wherein the second parameter includes a function for calculating a score corresponding to a pattern probability and a threshold value for the score.

10. The pattern classifying apparatus according to claim 1, wherein the instructions, when executed by the one or more processors, cause the pattern classifying apparatus to:
determine parameters referenced by the weak classifiers for pattern classification such that the feature images referenced by respective weak classifiers for pattern classification belong to different groups.

11. A pattern classifying method performed by a pattern classifying apparatus including a plurality of logically cascaded weak classifiers, the method comprising:
generating a plurality of feature images from an input image and divide the plurality of feature images into a plurality of groups;
storing each group of feature images into respective one of a plurality of memories, the plurality of memories holding data to be used in pattern classification;
accessing in parallel at least two of the plurality of memories holding data required to perform pattern classification by a first weak classifier among the plurality of logically cascaded weak classifiers so as to read out at least two feature image in parallel; and
performing the pattern classification with the first weak classifier by using the at least two read feature images; and
if the pattern classification with the first weak classifier is successfully performed, accessing in parallel the at least two memories holding data required to perform pattern classification by a second weak classifier that is subsequent to the first weak classifier so as to read out at least two feature images and perform the pattern classification with the second weak classifier by using the at least two read feature images.

12. A non-transitory computer readable storage medium storing a computer program for causing a computer including a plurality of logically cascaded weak classifiers to execute a method comprising:
generating a plurality of feature images from an input image and divide the plurality of feature images into a plurality of groups;
storing each group of feature images into respective one of a plurality of memories, the plurality of memories holding data to be used in pattern classification;
accessing in parallel at least two of a plurality of memories holding data required to perform pattern classification by a first weak classifier among the plurality of logically cascaded weak classifiers so as to read out at least two feature image in parallel; and
performing the pattern classification with the weak first classifier by using the at least two read feature images; and
if the pattern classification with the first weak classifier is successfully performed, accessing in parallel the at least two memories holding data required to perform pattern classification by a second weak classifier that is subsequent to the first weak classifier so as to read out at least two feature images and perform the pattern classification with the second weak classifier by using the at least two read feature images.

* * * * *